United States Patent [19]

Retallick et al.

[11] Patent Number: 4,601,999

[45] Date of Patent: Jul. 22, 1986

[54] METAL SUPPORT FOR A CATALYST

[75] Inventors: William B. Retallick, 1432 Johnny's Way, West Chester, Pa. 19382; F. Curtiss Dunbar, West Chester, Ohio

[73] Assignee: William B. Retallick, West Chester, Pa.

[21] Appl. No.: 738,485

[22] Filed: May 28, 1985

Related U.S. Application Data

[63] Continuation-in-part of Ser. No. 549,911, Nov. 9, 1983, abandoned.

[51] Int. Cl.⁴ .............................................. B01J 23/00
[52] U.S. Cl. .................................. 502/314; 502/257; 502/439; 423/213.5
[58] Field of Search .................. 502/314, 257, 439; 423/213.5

[56] References Cited

U.S. PATENT DOCUMENTS

| | | | |
|---|---|---|---|
| 1,636,685 | 7/1927 | Downs | 502/439 |
| 3,059,326 | 10/1962 | Jominy | 29/196.2 |
| 3,305,323 | 2/1967 | Smith | 29/180 |
| 3,338,733 | 8/1967 | Rowady | 117/50 |
| 3,362,783 | 1/1968 | Lear | 502/439 |
| 3,437,605 | 4/1969 | Keith | 502/439 |
| 3,712,856 | 1/1973 | Betz | 204/29 |
| 3,867,313 | 2/1975 | Brewer | 252/465 |
| 3,907,611 | 9/1975 | Sasame | 117/114 C |
| 3,907,708 | 9/1975 | Lacroix | 252/439 |
| 3,994,831 | 11/1976 | Betz | 502/25 A |
| 4,056,489 | 11/1977 | Hinding et al. | 502/25 A |
| 4,077,991 | 3/1978 | Acres et al. | 502/25 A |
| 4,079,157 | 3/1978 | Yagi et al. | 148/6.3 |
| 4,162,993 | 7/1979 | Retallick | 502/52 A |
| 4,179,412 | 12/1979 | Inaba | 252/472 |
| 4,188,309 | 2/1980 | Völker et al. | 502/25 A |
| 4,190,559 | 2/1980 | Retallick | 502/300 |
| 4,247,422 | 1/1981 | Davies | 502/314 |
| 4,277,374 | 7/1981 | Lula et al. | 423/213.5 |
| 4,301,039 | 11/1981 | Retallick | 502/52 A |
| 4,331,631 | 5/1982 | Chapman et al. | 502/439 |
| 4,425,380 | 3/1984 | Retallick | 422/171 |

FOREIGN PATENT DOCUMENTS

| | | | |
|---|---|---|---|
| 2732692 | 1/1979 | Fed. Rep. of Germany . | |
| 4842915 | of 1971 | Japan . | |
| 49-099982 | 9/1974 | Japan . | |
| 49-098390 | 9/1974 | Japan | 502/314 |
| 49-102589 | 9/1974 | Japan . | |
| 1106984 | 10/1974 | Japan | 502/439 |
| 49-106470 | 10/1974 | Japan . | |
| 50-017393 | 2/1975 | Japan | 423/213.5 |
| 50-066492 | 6/1975 | Japan . | |
| 156812 | 7/1977 | Japan . | |
| 54-097593 | 1/1979 | Japan | 502/336 |
| 54-021930 | 2/1979 | Japan . | |
| 2903080 | 8/1979 | Japan . | |
| 58-177456 | 10/1983 | Japan . | |
| 1368333 | 9/1974 | United Kingdom . | |

*Primary Examiner*—Andrew H. Metz
*Assistant Examiner*—Helane Myers
*Attorney, Agent, or Firm*—William H. Eilberg

[57] ABSTRACT

A metal support for a catalyst is disclosed, which is suitable for use in a catalytic converter for an automobile. The support generally does not interact with the catalyst, even at high temperatures, and the catalyst therefore retains its activity for a long period. The support includes a base metal containing chromium, aluminum and silicon, the remainder of the base metal being mostly iron. The specific percentages of chromium, aluminum, and silicon in the base metal can be varied according to a formula. The base metal is coated with a layer of metallic aluminum. A catalyst is applied to the support, preferably by first coating the support with a layer of alumina, and then impregnating the alumina layer with a suitable combustion catalyst. The support can be rolled down to foil thickness. When formed as a foil, the support is particularly useful in making catalytic converters for automobiles. The formula disclosed shows how aluminum or silicon can be substituted for some of the chromium in the base metal. The invention therefore provides a catalyst support of relatively low cost.

10 Claims, No Drawings

METAL SUPPORT FOR A CATALYST

CROSS-REFERENCE TO PRIOR APPLICATION

This is a continuation-in-part of U.S. patent application Ser. No. 549,911, filed Nov. 9, 1983, now abandoned.

BACKGROUND OF THE INVENTION

The present invention relates to the field of catalyst supports, and specifically to those supports which can be used to make catalytic converters for automobiles. The invention can also be used to make catalyst supports for catalytic incinerators, which burn out pollutants in a stream of air, or for other applications of catalysis.

In a catalytic converter for an automobile, it is necessary to display the catalyst on a supporting structure, so as to maximize the contact between the catalyst and the exhaust gas. Catalyst supports made of ceramic materials have been known for a long time, and were known before metal supports were developed. But supports made of thin metals have the advantage that they can be made in large cross-sections, as would be needed for treating large gas flows. Another advantage of metal is that the walls of the support can be made thinner, thereby giving a higher open frontal area, and a lower pressure drop through the support. In addition, for metals which can be rolled down to a foil, it is comparatively easy to fabricate such metals into any shape desired.

Only a few metals have been usable as catalyst supports, in the prior art. A constant problem has been that many metals react chemically with the catalyst, causing the catalyst to lose its activity. Such reaction is especially likely at the high temperatures present in automobile exhaust gas.

Metal honeycomb catalyst supports are described in U.S. Pat. Nos. 4,162,993, 4,190,559, 4,247,422, 4,301,039, 4,350,617, 4,402,871, and 4,425,305. All of the above patents are incorporated herein by reference.

Metal-supported catalysts for use in automobile converters have been under development for about ten years. A metal catalyst support for an automobile converter must not only withstand high temperatures, which can approach 2000° F., but must also withstand frequent heating and cooling, as well as vibrations from the automobile, and should, ideally, last for the life of the vehicle. Society of Automotive Engineers Paper 770299 (1977) describes the development of an automobile catalyst. In the cited paper, four metals were tested as catalyst supports. The criterion considered was resistance to oxidation at a temperature of 1085° C., when the metal is rolled into a foil only 0.002 inches thick. The only metal to pass this test is known by the trade name Fecralloy, and has 4-5% aluminum, 15-20% chromium, 0.1-0.3% yttrium, the remainder being iron. Fecralloy is a product of the UK Atomic Energy Authority. Similar alloys are made in the United States, for example the alloy known as Kanthal A-1, made by Kanthal Corporation. Kanthal A-1 contains 5.5% aluminum, 22% chromium, 0.5% cobalt, the remainder being iron.

When the above-described alloys are heated, the aluminum diffuses to the surface, where it forms an adherent self-healing aluminum oxide diffusion barrier. This barrier prevents further oxidation, so that it protects the metal core. The barrier also prevents, at least partly, base metal in the core from diffusing into the catalyst coating. The catalyst coating would be better protected if the barrier could be made thicker. It would seem natural to accomplish this by adding more aluminum to the alloy. However, at higher levels of aluminum content, the alloy splits or cracks when it is rolled into the thin foil that is needed for making honeycomb catalyst supports.

Another seemingly simple solution would be to make the catalyst support from aluminized steel sheet, which is unalloyed iron that is coated with aluminum. Upon heating, the aluminum is oxidized to aluminum oxide. Apparently, a barrier of any thickness could be formed by starting with a sufficiently thick coating of aluminum. In my experiments, this method failed because at high temperature, the iron core oxidized and caused the catalyst coating to spall off.

U.S. Pat. No. 4,247,422 describes a method of making a honeycomb from thin metal foil, rich in aluminum, without having to roll down an alloy that is rich in aluminum. The honeycomb is formed from a foil of substantially pure iron. Then aluminum and chromium are diffused into the iron by soaking the honeycomb in a lead bath that contains the aluminum and chromium in solution. The aluminum and chromium are not uniformly distributed throughout the base metal. Instead, there is a gradient in its chromium and aluminum content, with most of the chromium and aluminum being located in an outer layer.

To make a metal-supported catalyst, a base metal is coated with activated alumina ($Al_2O_3$) having a surface area of about 50-200 $m^2/g$. The alumina is applied as a slip or slurry, which is dried and calcined to form the alumina coating. Then the alumina coating is impregnated with the catalyst metal, usually a platinum group metal.

The procedure for applying the alumina and the catalyst to the metal support is well known in the prior art, and is used regardless of the composition of the metal support. The difficulty lies in selecting a composition for the base metal, such that the base metal does not interact with the impregnated catalyst and destroy its activity. At temperatures above about 900° C., the base metal of the support can diffuse into the alumina coating and react with the coating, and also with the platinum metal supported thereon. The base metal accelerates sintering of the alumina coating, whereby the surface area of the alumina coating is reduced. Also, the base metal forms alloys with the platinum metal, which alloys have less catalytic activity than the unalloyed platinum metal. The present invention therefore is concerned with providing a composition which can be used as a metal support.

An example of a metal catalyst support is described in Japanese Patent Application No. 49-99982. The latter reference discloses a support consisting of an aluminum-clad iron sheet, and another support made with 18-8 stainless steel, also coated with aluminum. Both supports are then coated with a combustion catalyst. The reference contains no hint of the temperatures at which the support was tested. In addition, we have found that aluminum-coated 18-8 stainless steel cannot be rolled down to foil thickness.

Another example of a metal catalyst support is given in U.S. Pat. No. 3,873,472. This patent, like the Japanese application discussed above, discloses supports having a base metal of substantially pure iron, or a base metal made of 18-8 or 18-12 stainless steels.

The present invention provides a metal catalyst support wherein the base metal does not react with the catalyst, and wherein the catalyst retains its activity over a long period of time, and at very high temperatures. The metal catalyst support of the invention can also be formed into the thin foil which is needed to make catalytic converters for automobiles.

SUMMARY OF THE INVENTION

In its most basic form, the invention comprises a metal alloy having a chromium equivalent percentage in a specified range, the base metal being coated with a layer of aluminum. The chromium equivalent percentage is defined by Chromium equivalent
$\% = (\%Cr) + (3.0)(\%Al) + (1.5)(\%Si)$, where %Cr means the percentage of chromium by weight, and so on. The remainder of the base metal is mostly iron.

The limits of the allowed range of the chromium equivalent percentage depend in part on the thickness of the coated base metal. In one embodiment, the chromium equivalent percentage of the base metal is in the range of about 3 to about 30, and the thickness of the coated base metal is greater than about 0.010 inches. In another embodiment, the chromium equivalent percentage is in the range of about 3 to about 15, with the thickness of the coated metal again being greater than about 0.010 inches. In still another embodiment, wherein the coated base metal has been rolled down to a foil which is about 0.0015–0.0040 inches thick, the chromium equivalent percentage should be greater than about 8. The range of about 8 to about 15 is thus a preferred range for the chromium equivalent percentage, and will make an acceptable support over the widest range of thicknesses.

In addition to the limitations implied by the chromium equivalent percentage formula given above, the amount of aluminum in the base metal must be less than about 3%. Also, the amount of silicon in the base metal should be less than about 1%. For greater content of aluminum and silicon, it becomes difficult to wet the base metal with molten aluminum, and also it becomes difficult to roll the coated base metal down to foil thickness.

A catalyst support is made by preparing a base metal alloy as described above, and coating the base metal with a layer of aluminum. This coated structure comprises the support of the present invention. Before use, the aluminum-coated base metal is coated with alumina, and the alumina is then impregnated with a suitable catalyst.

It is therefore an object of the invention to provide a metal support for a catalyst.

It is another object to provide a metal catalyst support which does not react with the catalyst.

It is another object to provide a metal catalyst support which can be used at high temperatures, and for long periods, without adversely affect the activity of the catalyst.

It is another object to provide a composition of matter which can be easily fabricated into a catalyst support having a honeycomb shape.

It is another object to provide a composition of matter which is particularly suitable for use in making catalytic converters for automobiles.

It is another object to provide a metal which can be rolled down to foil thickness for use as a catalyst support.

It is another object to provide a method of making a metal support for a catalyst.

Other objects and advantages will be apparent to those skilled in the art, from a reading of the following detailed description of the invention and the appended claims.

DETAILED DESCRIPTION OF THE INVENTION

The metal support of the present invention comprises an iron-based alloy containing chromium, aluminum, and silicon according to a formula shown below. The alloy is coated with a layer of aluminum. The coated structure constitutes the catalyst support of the invention. In order to use the support, it is necessary to coat the support with a porous substance, such as alumina ($Al_2O_3$), which will hold the catalyst.

The concept of "chromium equivalent percentage" is vital to the invention. Chromium equivalent percentage is defined by the expression Chromium equivalent
$\% = (\%Cr) + (3.0)(\%Al) + (1.5)(\%Si)$, where %Cr means the percentage by weight of chromium, %Al means the percentage by weight of aluminum, and %Si means the percentage by weight of silicon. As will be explained below, the amounts of chromium, aluminum, and silicon in the base metal may be varied independently, subject to certain limits on the amounts of the individual components, as long as the chromium equivalent percentage falls in the desired range.

In one embodiment, it has been found that, if the aluminum-coated base metal has a thickness of at least about 0.010 inches, the chromium equivalent percentage of the base metal should be in the range of about 3 to about 30. If it is desired to roll down the coated base metal into a foil, to a thickness of about 0.0015 inches to about 0.0040 inches, then the chromium equivalent percentage should be above about 8.

It is also necessary that the amount of aluminum must be limited to less than about 3%. An aluminum content greater than about 3% will cause difficulty in wetting with molten aluminum and also in rolling down to a foil.

It is also necessary, for the same reasons, that the amount of silicon be no more than about 1%.

The limitation that the catalyst support have a thickness of at least about 0.010 inches when the chromium equivalent percentage is low is a consequence of experiments described in the examples below. However, it is believed that, even with a chromium equivalent percentage below about 8, the catalyst support would perform satisfactorily at thicknesses below 0.010 inches, possibly including thicknesses as low as about 0.004 inches, i.e. a relatively thick foil.

It is noted that the element aluminum may appear in three different places in the final product. First, there may be aluminum in the base metal alloy. Secondly, there is an aluminum coating on the base metal. Thirdly, there is aluminum in the coating of alumina which is applied to the aluminum-coated base metal. The composition of the invention comprises the first two layers, i.e. the base metal and the coating of metallic aluminum.

It is an important advantage of the invention that a support can be constructed using relatively small amounts of expensive metals, such as chromium. By substituting limited amounts of aluminum and/or silicon, as indicated by the chromium equivalent percentage formula, the amount of chromium can be reduced. Thus, as will be shown in the examples below, workable supports have been made with as little as 1% chromium. Other supports have been made containing 11% chromium.

Furthermore, there is no need for other expensive metals such as nickel, in the base metal. In fact, the presence of nickel has proved to be a detriment, because an aluminum-coated nickel-bearing alloy cannot be rolled down into a foil. A nickel-bearing alloy work hardens rapidly upon rolling so that it must be annealed to continue the rolling. But annealing causes the aluminum coating to diffuse into the nickel alloy, where it forms a brittle alloy with the nickel. This brittle alloy resists further reduction, so that it cannot be reduced to foil thickness. Alloys of the present invention can be rolled down to foil thickness without annealing. It is important to be able to form the catalyst support as a foil, because a foil is needed to make a catalytic converter for an automobile.

The preferred range for the chromium equivalent percentage is about 8 to about 15. This range represents a good compromise between the expense of the base metal and the performance of the metal as a catalyst support at low thicknesses. As indicated above, if the catalyst support is of greater than foil thickness, the chromium equivalent percentage can be reduced further.

The following example illustrates the importance of the basic concepts of the invention, namely the need for a chromium equivalent percentage in the desired range, and the need for an aluminum coating on the base metal.

EXAMPLE 1

Five candidate catalyst supports, having the compositions and thicknesses given in the table shown below, were prepared and tested by the following procedure. The supports were coated with a slurry of activated alumina, dried and calcined, impregnated with a solution of catalyst metals, and dried and calcined again. The test apparatus was a wood stove. The catalyst was supported on metal strips having dimensions of 5.5×3 inches, the strips being stacked in spaced-apart relation, so that the combustion gas from the fire could flow between the strips. About 25 strips were used for each test support, spaced at about 5 strips per inch. This configuration is illustrated in U.S. Pat. No. 4,425,305.

The combustion gas contained unburned hydrocarbons, creosote vapors, and carbon monoxide, which were combusted on the catalyzed surface of the metal strips. The test cycle in the stove lasted 24 hours. At the beginning of a cycle, the stove was charged with 16.5 pounds of a standard wood, and the fire was lighted. After 4 hours, another 7 pounds of wood was added to the fire. No more wood was added during the 24-hour test cycle. The temperature within the nest of catalyzed strips was recorded throughout the 24-hour test cycle. The average temperature during the first 6 hours was the signature of the catalyst. The higher the average temperature, the more nearly complete the combustion, and the more active the catalyst. For a fresh catalyst, the 6-hour average temperature was about 1000°–1100° F. There were temperature excursions up to about 1900° F., and these were most likely to occur when fresh wood was added at the fourth hour of the test cycle. Thus, the test was more severe than would be indicated by the average temperature of 1000°–1100° F.

The criterion for sustained activity was that the 6-hour average temperature remain constant during successive 24-hour test cycles. As shown in the table, the only metal support made according to the present invention was Support No. 5. Support Nos. 1, 2, and 3 had chromium equivalent percentages of 25.5, 27.3, and 26.5, but lacked an aluminum coating. Support No. 4, while having an aluminum coating, had nothing but iron in the base metal, and therefore had a chromium equivalent percentage of zero. Support No. 5 had a chromium equivalent percentage of 4.75 and also an aluminum coating.

| | TABLE OF TEST RESULTS | | | | |
|---|---|---|---|---|---|
| | Support No. | | | | |
| | 1 | 2 | 3 | 4 | 5 |
| Aluminum Coating (g/m$^2$) | 0 | 0 | 0 | 80 | 110 |
| Composition of Base Metal (in %): | | | | | |
| Chromium | 18.0 | 18.3 | 13.3 | 0 | 1.0 |
| Nickel | 0.5 | 0 | 0 | 0 | 0 |
| Aluminum | 2.0 | 2.9 | 4.2 | 0 | 0 |
| Titanium | 0.4 | 0.3 | 0.3 | 0 | 0 |
| Manganese | 0.5 | 0.2 | 0.4 | 0 | 0 |
| Silicon | 1.0 | 0.2 | 0.4 | 0 | 0.5 |
| Iron (remainder) | 77.6 | 78.1 | 81.4 | 100 | 97.5 |
| Catalyst Metal | Platinum plus Palladium | Platinum plus Palladium | Platinum plus Palladium | Platinum | Platinum |
| Thickness of support (inches) | .036 | .020 | .020 | .030 | .046 |
| Number of test cycles with constant activity | 1 | 1 | 3 | 1 | 16 |

Note:
Support No. 5 contained minor amounts of columbium and titanium.
The aluminum coating in Support No. 5 contained 9% silicon The only metal support without an aluminum coating that survived more than one cycle was Support No. 3.

Support No. 4, which was unalloyed iron coated with aluminum, survived only one cycle. In addition, the iron oxidized and the catalyst coating spalled off. Support No. 5, which represents one embodiment of the present invention, was superior to all the others shown in the table. The aluminum coating more than compensates for the low content of chromium in the core alloy, which is only 1%.

The catalyst used with Support No. 5 appeared to be exceptionally active early in its test, so the test was continued under conditions more severe than for the other supports. Instead of burning in 24-hour cycles, with wood added only at zero hours and at 4 hours, wood was added continually during 4 days of continuous burning, so that there was always a nearly full load of wood. There was no apparent loss of activity during the 4 days. The 4 days is equivalent to about 16 of the usual 6-hour periods of fast burning.

The following example shows the performance of a support similar to Support No. 5 of Example 1, but having a reduced thickness.

EXAMPLE 2

A test was made wih the material which was used for Support No. 5 of Example 1. This sample had a thickness of about 0.013 inches. The support was formed by winding a strip of the sample material into a spiral. The aluminum coating was commercially pure aluminum, and did not contain 9% silicon, as did the coating in the first test with this material.

The sample was tested in a wood stove, as in Example 1. This test was continued for 25 days. The catalyst maintained its acitivity throughout this period. Only at the end of 25 days did the activity begin to decline slowly.

The following two examples describe tests of a catalyst support made according to the present invention. The test conditions more nearly approximated those in a catalytic converter in an automobile. The examples also show the performance of the present invention at foil thickness.

EXAMPLE 3

The base metal was in aluminum-coated alloy known as NP 614, available from Armco, Inc. The base metal had a composition of 11% chromium, 0.5% silicon, 0.0% aluminum, 0.3% manganese, 0.3% titanium, and 0.2% nickel, so that its chromium equivalent percentage was 11.75. The sample was dipped in a bath of substantially pure molten aluminum, so that it was completely coated. The sample was rolled down to a thickness of 0.0025 inches, and was heat treated at 1500° F., to enhance its ability to hold a catalyst. The sample was then coated with a slurry of alumina ($Al_2O_3$), and was impregnated with a catalyst. The weight of the alumina coating was 4 mg/in$^2$, and this alumina coating was impregnated with 0.24 mg/in$^2$ of platinum, and 0.04 mg/in$^2$ of rhodium.

Two strips of metal, prepared as described above, were used to make the catalyst support. One of the strips was corrugated, and the flat strip and the corrugated strip were wound together to make a spiral catalyst support, two inches in diameter and two inches long. The support was placed in a tester, and a flame of natural gas (methane) was lit under the support. The gas supply was momentarily cut off, extinguishing the flame, and the gas flow was then resumed. Catalytic combustion ensued. The flow of air was adjusted so that the temperature in the support was 1650° F. This temperature was chosen because it is the highest temperature ever expected to be sustained for an extended period in a catalytic converter in an automobile. The flow of gas through the combustor was regulated at 0.3 ft$^3$/min.

The activity of the catalyst was measured periodically. This measurement was made by shutting off the flow of gas, allowing the combustor to cool, bleeding in a small quantity of gas, and observing whether the catalytic combustion resumed. The resumption of catalytic combustion was indicated by an observed increase in temperature. If the catalytic combustion did in fact resume, the gas flow was shut off again, and the combustor was allowed to cool further, and the process was repeated. The lowest temperature at which the catalyst would reignite is called the "light-off" temperature.

After 1820 hours of combustion, the light-off temperature of the catalyst was under 400° F. This light-off temperature meets the industry standards for acceptable catalyst activity. In other words, the catalyst was still performing acceptably after 1820 hours. If one assumes an average automobile speed of 30 mi/hr, this operating period corresponds to more than 50,000 miles. Thus, the catalytic combustor made from the rolled down NP 614 survived the equivalent of over 50,000 miles of driving, at 30 mi/hr, and the catalyst was still working.

EXAMPLE 4

Another test, under more severe conditions, was performed on a catalyst support made with the alloy used in Example 3, and using the same procedure. In this test, the aluminum-coated base metal was rolled down to a thickness of 0.0025 inches, heat treated at 1500° F., and coated with alumina to a weight of 4 mg/in$^2$. A catalyst material comprising platinum, having a weight of 0.11 mg/in$^2$, and rhodium, having a weight of 0.01 mg/in$^2$, was impregnated in the alumina, as before. The resulting catalyzed foil was made into a spiral-wound catalyst support, two inches in diameter and two inches long.

The temperature of the test was 2000° F. After the combustion had continued for 205 hours, the light-off temperature was measured to be about 570° F.

The normal operating temperature in a catalytic converter in an automobile is only about 1100° F. The maximum temperature observed in such a catalytic converter is about 1800° F., and this temperature is attained for only very short periods, and only when the automobile is operated at very high speeds, in excess of about 130 mi/hr. In short, this combustor performed remarkably well. It lasted 205 hours at temperatures that are hardly ever reached in the normal operation of an automobile.

It has been found, through further experiment, that a foil having a chrominum equivalent percentage of about 4.75 will not last for a significant time when tested under the rigorous conditions described in Example 4. It is believed that, by increasing the chromium equivalent percentage to about 8, the support will perform satisfactorily when rolled down to a foil thickness.

The above examples show catalyst supports for combustion catalysts. The support of the present invention, however, is not limited to combustion catalysts, but can be used with any catalyst that operates at high temperature, where interaction with a metal support could destroy the catalytic activity.

A method for coating low alloy steels with aluminum is described in U.S. Pat. No. 3,925,597, the disclosure of which is incorporated by reference herein. The properties and uses of aluminum-coated steels are described in a paper entitled "Aluminum Coated Steels, Past, Present, and Future", by F. Curtiss Dunbar of Armco, Inc., presented at the American Society of Metals Congress, Oct. 25, 1982, in St. Louis. The coating described as "Type 1" in the latter paper is the coating tested in the samples of Example 1. The latter paper is also incorporated by reference herein.

It has been found that, after the catalyst support of the present invention is heated, the aluminum of the coating will diffuse into the base metal. Thus, after heating, the aluminum content of the base metal may exceed the original aluminum content. However, this does no harm when the catalyst support has already been rolled down to foil thickness. For a catalyst support that is to be rolled down to a foil, one should not start with a base metal having more than about 3% aluminum, but a catalyst support whose aluminum content increases above about 3% due to diffusion from the aluminum coating is entirely satisfactory, and itself represents still another embodiment of the invention.

It is understood that the specific examples given in the above descriptions are not to be deemed to limit the invention as claimed. Many embodiments of the invention are possible within the claimed composition ranges. All such embodiments are to be considered within the spirit and scope of the following claims.

What is claimed is:

1. A metal support for a catalyst, comprising a substantially homogeneous base metal, the base metal having a chromium equivalent percentage above about 8, the chromium equivalent percentage being defined by Chromium equivalent
$\% = (\%Cr) + (3.0)(\%Al) + (1.5)(\%Si)$, the amount of silicon being less than about 1% and the amount of aluminum being less than about 3%, the remainder of the base metal being mostly iron, the base metal having a coating of substantially pure aluminum, wherein the coated base metal comprises a foil having a thickness in the range of about 0.0015–0.0040 inches.

2. The support of claim 1, wherein the amount of chromium in the base metal is less than about 14%.

3. A metal support for a catalyst, comprising a substantially homogeneous base metal, the base metal having a chromium equivalent percentage in the range of about 3 to about 15, the chromium equivalent percentage being defined by Chromium equivalent
$\% = (\%Cr) + (3.0)(\%Al) + (1.5)(\%Si)$, the amount of silicon being less than about 1%, the amount of aluminum being less than about 3%, the base metal being sustantially free of nickel, the remainder of the base metal being mostly iron, the base metal having a coating of substantially pure aluminum, and wherein the coated base metal has a thickness greater than about 0.010 inches.

4. The support of claim 3, wherein the amount of chromium in the base metal is less than about 14%.

5. A metal support for a catalyst, comprising a substantially homogeneous base metal, the base metal having a chromium equivalent percentage in the range of about 8 to about 15, the chromium equivalent percentage being defined by Chromium equivalent
$\% = (\%Cr) + (3.0)(\%Al) + (1.5)(\%Si)$, the remainder of the base metal being mostly iron, the base metal having a coating of substantially pure aluminum, the amount of aluminum in the base metal being less than about 3%, and the amount of silicon in the base metal being less than about 1%.

6. The support of claim 5, wherein the amount of chromium in the base metal is less than about 14%.

7. A metal support for a catalyst, comprising a substantially homogeneous base metal, the base metal having a chromium equivalent percentage in the range of about 3 to about 30, the chromium equivalent percentage being defined by Chromium equivalent
$\% = (\%Cr) + (3.0)(\%Al) + (1.5)(\%Si)$, the base metal being substantially free of nickel, the amount of silicon in the base metal being less than about 1%, the amount of aluminum being less than about 3%, the base metal having a coating of substantially pure aluminum, and wherein the coated base metal has a thickness greater than about 0.010 inches.

8. The support of claim 7, wherein the amount of chromium in the base metal is less than about 14%.

9. A metal support for a catalyst, comprising a substantially homogeneous base metal, the base metal having a chromium equivalent percentage above about 8, the chromium equivalent percentage being defined by Chromium equivalent
$\% = (\%Cr) + (3.0)(\%Al) + (1.5)(\%Si)$, the base metal being substantially free of nickel, the amount of silicon in the base metal being less than about 1%, the amount of aluminum in the base metal being less than about 3%, the base metal having a coating of substantially pure aluminum, wherein the coated base metal comprises a foil having a thickness in the range of about 0.0015–0.0040 inches.

10. The support of claim 9, wherein the amount of chromium in the base metal is less than about 14%.

* * * * *